(12) United States Patent
Rho et al.

(10) Patent No.: US 8,549,945 B2
(45) Date of Patent: Oct. 8, 2013

(54) REDUCER OF ELECTRONIC POWER STEERING APPARATUS

(75) Inventors: Hee-dong Rho, Wonju (KR); Young-sock Jung, Wonju (KR)

(73) Assignee: Mando Corporation, Gyeonggi-Do (KR)

(*) Notice: Subject to any disclaimer, the term of this patent is extended or adjusted under 35 U.S.C. 154(b) by 645 days.

(21) Appl. No.: 12/613,923

(22) Filed: Nov. 6, 2009

(65) Prior Publication Data

US 2010/0116582 A1    May 13, 2010

(30) Foreign Application Priority Data

Nov. 12, 2008 (KR) .................. 10-2008-0112049
Nov. 17, 2008 (KR) .................. 10-2008-0113903

(51) Int. Cl.
*F16H 35/00* (2006.01)
*F16H 1/16* (2006.01)
*F16C 23/00* (2006.01)

(52) U.S. Cl.
USPC ................. 74/388 PS; 74/425; 384/256

(58) Field of Classification Search
USPC ...... 74/388 PS, 409, 425, 411; 384/519, 256, 384/257, 252
See application file for complete search history.

(56) References Cited

U.S. PATENT DOCUMENTS

| | | | | |
|---|---|---|---|---|
| 4,463,819 A * | 8/1984 | Becker et al. | ................. | 180/441 |
| 5,358,224 A * | 10/1994 | Balsells | ......................... | 267/33 |
| 5,478,059 A * | 12/1995 | Toyoshi et al. | ............... | 267/273 |
| 6,523,431 B2 * | 2/2003 | Ozsoylu et al. | ................. | 74/443 |
| 6,705,176 B2 * | 3/2004 | Ishii et al. | ................. | 74/388 PS |
| 6,823,962 B2 * | 11/2004 | Iwasa et al. | ................... | 180/444 |
| 6,860,829 B2 * | 3/2005 | Bock et al. | ...................... | 475/18 |
| 7,188,700 B2 * | 3/2007 | Eda et al. | ...................... | 180/444 |
| 7,360,467 B2 * | 4/2008 | Segawa et al. | ................... | 74/425 |
| 7,748,492 B2 * | 7/2010 | Iwasa et al. | .................... | 180/444 |
| 8,001,866 B2 * | 8/2011 | Song et al. | ...................... | 74/409 |
| 8,074,531 B2 * | 12/2011 | Yamazaki et al. | ......... | 74/388 PS |
| 2006/0104553 A1 * | 5/2006 | Faust et al. | ...................... | 384/49 |
| 2006/0117883 A1 * | 6/2006 | Yasuda et al. | ............. | 74/388 PS |
| 2008/0034910 A1 * | 2/2008 | Roline et al. | .................... | 74/422 |
| 2010/0006069 A1 * | 1/2010 | Yoshikawa et al. | ......... | 123/48 B |

* cited by examiner

*Primary Examiner* — Justin Krause
*Assistant Examiner* — Gregory Prather
(74) *Attorney, Agent, or Firm* — McDermott Will & Emery LLP

(57) ABSTRACT

A reducer of an electronic power steering apparatus is disclosed. The reducer of an electronic power steering apparatus aids the operation of a steering wheel by the driver by preventing a clearance from being caused by frictional wear between a worm and a worm wheel, by reducing rattle noise caused by backlash, and by minimizing the change in the clearance due to a change in torque.

13 Claims, 10 Drawing Sheets

REDUCER OF ELECTRONIC POWER STEERING APPARATUS

BACKGROUND OF THE INVENTION

1. Field of the Invention

The present invention relates to a reducer of an electronic power steering apparatus, and more particularly to a reducer of an electronic power steering apparatus that aids the operation of a steering wheel by the driver by preventing a clearance from being caused by frictional wear between a worm and a worm wheel, by reducing rattle noise caused by backlash, and by minimizing the change in the clearance due to a change in torque.

2. Description of the Prior Art

FIG. 1 is a schematic view of a conventional electronic power steering apparatus. As illustrated in FIG. 1, the electronic power steering apparatus 100 includes a steering system 130 extending from a steering wheel 102 to wheels 126 and an auxiliary power mechanism 140 providing auxiliary steering power to the steering system 130.

The steering system 130 includes a steering shaft 106 one side of which is connected to the steering wheel 102 to be rotated in conjunction with the steering wheel 102 and the opposite side of which is connected to a pinion shaft 108 by the medium of a pair of universal joints 104. The pinion shaft 108 is connected to a rack bar 112 though a rack and pinion mechanism 110, and opposite ends of the rack bar 112 are connected to the wheels 126 of the vehicle through tie rods 122 and knuckle arms 124.

The auxiliary power mechanism 140 includes a torque sensor 142 detecting a torque applied to the steering wheel 102 by the driver and outputting an electrical signal in proportion to the detected torque, an electronic control unit 144 generating a control signal based on the electrical signal transmitted from the torque sensor 142, a motor 146 generating auxiliary power based on the control signal transmitted from the electronic control unit 144, and a reducer 150 having a worm 152 and a worm wheel 156 to transmit the auxiliary power generated by the motor 146 to the steering shaft 106.

Accordingly, in the electronic power steering apparatus 100, the torque generated by the rotation of the steering wheel 102 is transmitted to the rack bar 112 via the rack and pinion mechanism 110, and the auxiliary power generated by the motor 146 due to the generated torque is transmitted to the rack bar 112.

That is, both the torque generated by the rotation of the steering wheel 102 and the auxiliary power generated by the motor 146 axially move the rack bar 112.

FIG. 2 is a sectional view illustrating the reducer of the conventional electronic power steering apparatus. As illustrated in FIG. 2, in the reducer 150, a worm 152 is formed on a worm shaft 254 and worm shaft bearings 257 are installed at opposite ends of the worm shaft 254 to support the worm shaft 254. A plug bolt 210 is coupled between a damping coupler 240 and one of the worm shaft bearings 257 to prevent the bearing 257 from being pushed in the axial direction of the worm shaft 254, and is fixed by a plug nut 220.

The worm shaft 254 is connected to the motor 146 by the medium of the damping coupler 240 to be rotated by the drive force of the motor 146.

The worm wheel 156 is formed on one side of the outer periphery of the worm 152 on the worm shaft 254 to enmesh the worm 152, and is mounted to the steering shaft 106 transmitting the rotational force of the steering wheel 102 operated by the driver so that the rotational force of the worm shaft 254 by the drive force of the motor 146 is transmitted to the steering shaft 106.

The gear housing 260 carries the worm 152 and the worm wheel 156 and the motor 146 transmitting a drive force to the worm shaft 254 is provided on one side of the gear housing 260. The motor 146 is coupled to the gear housing 260 by means of a motor cover 230 using a bolt 250.

Balls 258 are interposed between an inner race 280 and an outer race 270 of the worm shaft bearing 257 to support the rotation of the worm shaft 254 connected to the motor 146 at one end of the gear housing 260.

The reducer of the electronic power steering apparatus smoothly and stably maintains the steering operation of the driver by controlling drive of the motor using the electronic control unit of the vehicle according to the travel condition of the vehicle and by transmitting the rotational force of the worm shaft generated by the drive force of the motor in addition to the rotational force of the steering wheel operated by the driver.

However, in the reducer of the conventional electronic power steering apparatus, a clearance is caused by frictional wear between the worm rotated by the drive force of the motor and the worm wheel and rattle noise is generated by backlash.

This problem, in turn, hampers accurate transmission of the auxiliary steering force for aiding the operation of the steering wheel by the driver.

SUMMARY OF THE INVENTION

Accordingly, the present invention has been made to solve the above-mentioned problems occurring in the prior art, and an object of the present invention is to provide a reducer of an electronic power steering apparatus that aids the operation of a steering wheel by the driver by preventing a clearance from being caused by frictional wear between a worm and a worm wheel, by reducing rattle noise caused by backlash, and by minimizing the change in the clearance due to a change in torque.

In order to accomplish this object, there is provided A reducer of an electronic power steering apparatus including, a worm shaft bearing supporting an end of a worm shaft on which a worm enmeshing with a worm wheel is formed, the end of the worm shaft being opposite to a portion of the worm shaft to which a motor shaft is coupled; a hollow bearing holder mounted on an outer race of the worm shaft bearing such that a clearance is maintained between the bearing holder and the outer race of the worm shaft bearing; a holder housing surrounding the outer periphery of the bearing holder and fitted with an inner end of a gear housing; a worm shaft holder coupled to an end of the worm shaft such that a clearance is formed between the worm shaft holder and the inner surface of the holder housing in the direction of the worm wheel; and a resilient support coupled between the inner surface of the holder housing and the worm shaft holder on a side of the holder housing opposite to the worm wheel to support the worm shaft holder in the direction of the worm wheel.

The inventive reducer of an electronic power steering apparatus according to the present invention aids the accurate operation of a steering wheel by the driver by preventing a clearance from being caused by frictional wear between a worm and a worm wheel, by reducing rattle noise caused by backlash, and by minimizing the change in the clearance due to a change in torque.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
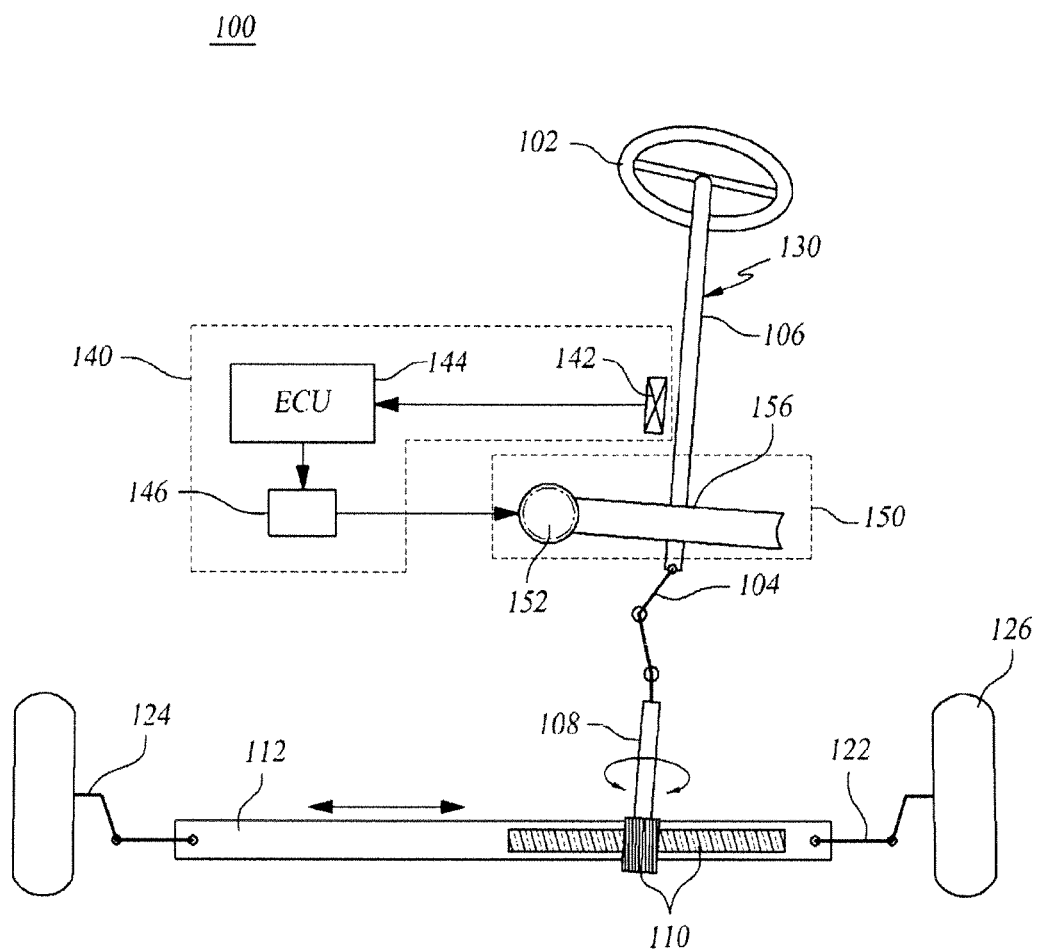
FIG. 1 is a schematic view of a conventional electronic power steering apparatus.
Figure 2:
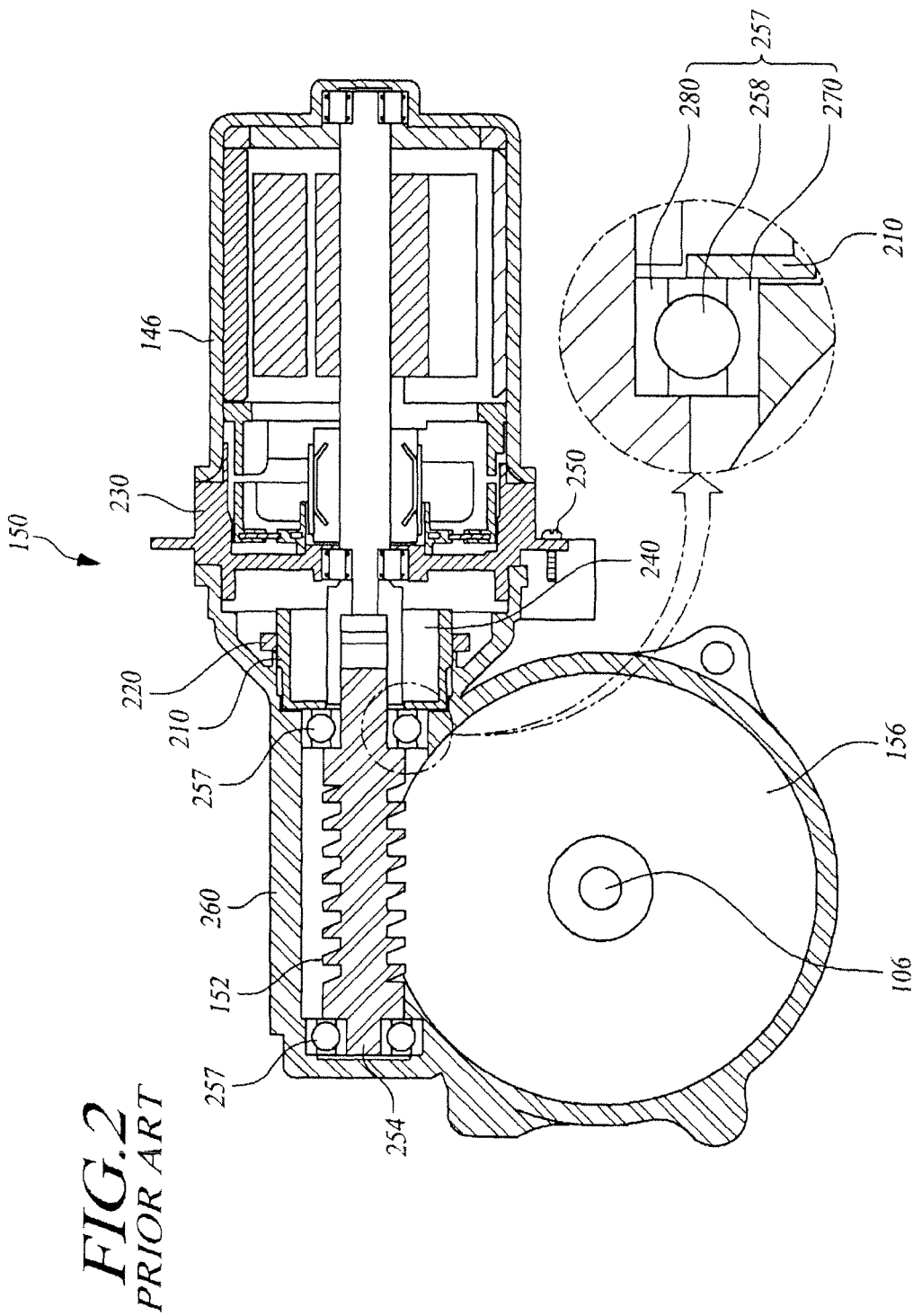
FIG. 2 is a sectional view illustrating a reducer of the conventional electronic power steering apparatus.

Hereinafter, preferred embodiments of the present invention will be described with reference to the accompanying drawings. In the following description and drawings, the same reference numerals are used to designate the same or similar components, and so repetition of the description on the same or similar components will be omitted.

In the description of the elements of the present invention, the terms 'first', 'second', 'A', 'B', '(a)', and '(b)' may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to', "engaged with", or "connected to" the other element between them.

Figure 3:
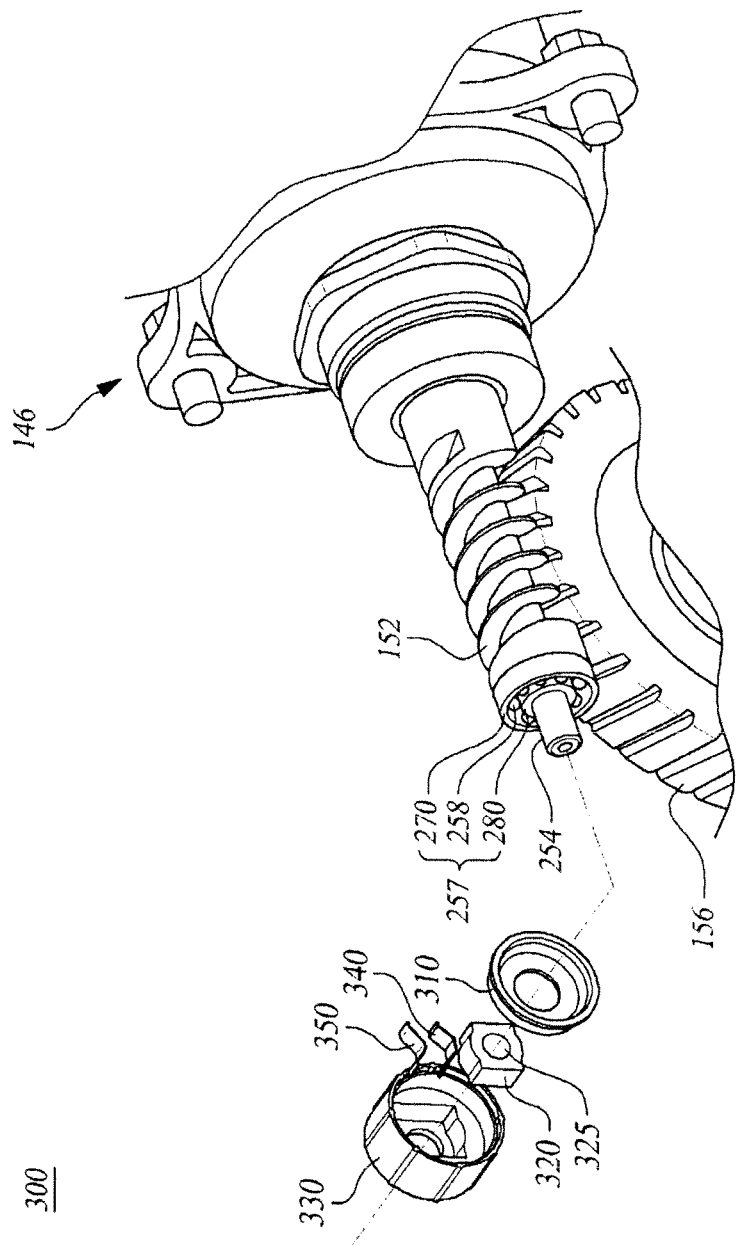
FIG. 3 is a perspective view illustrating a portion of a reducer of an electronic power steering apparatus according to the first embodiment of the present invention.
Figure 4:
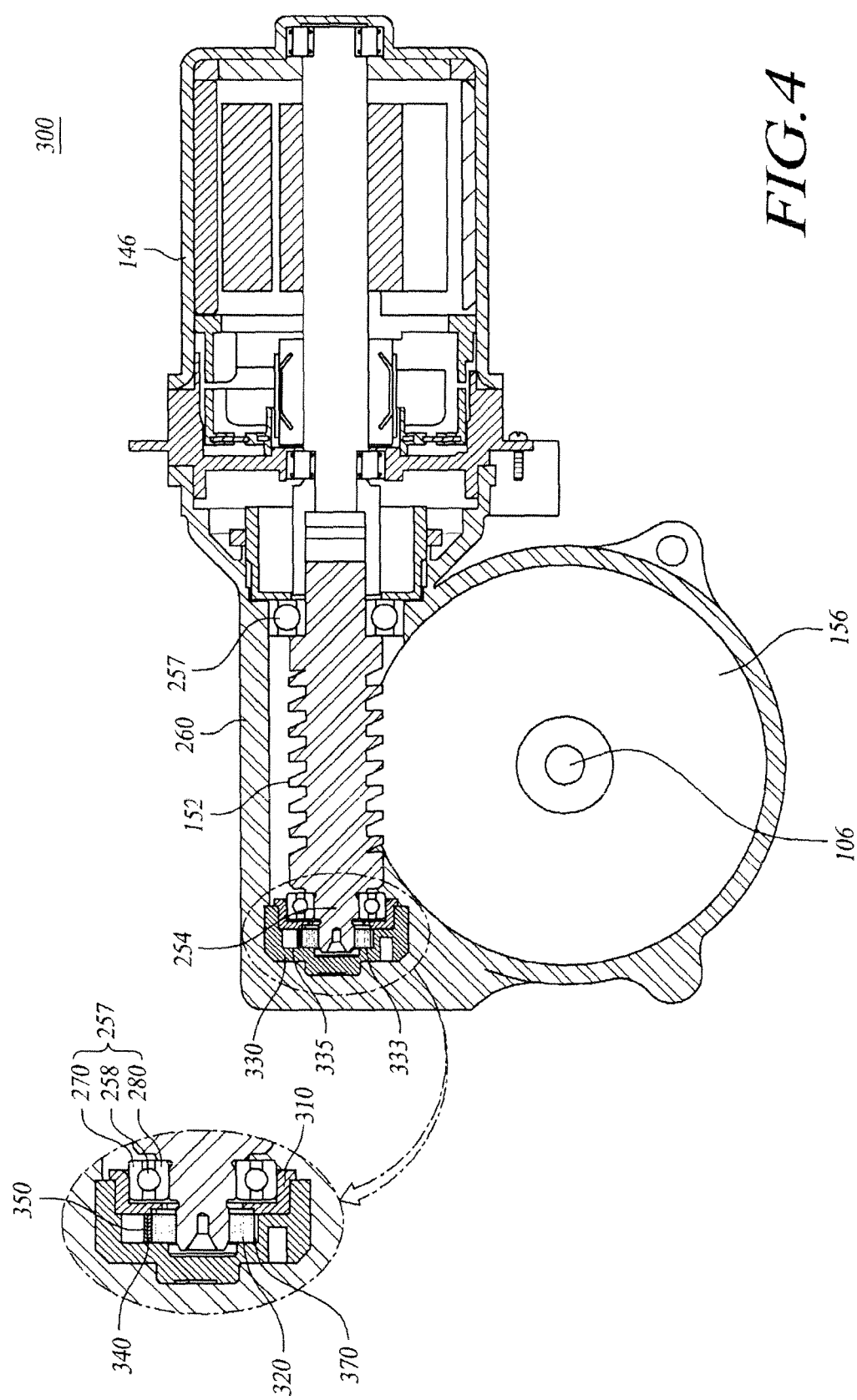
FIG. 4 is a sectional view of the reducer of FIG. 3.
Figure 5:
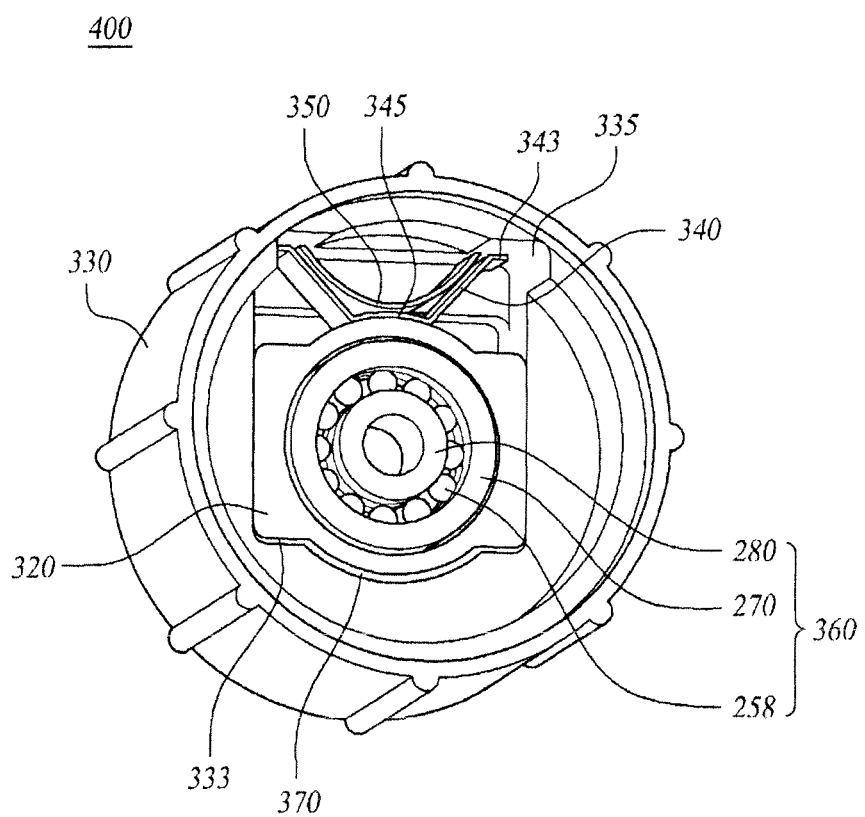
FIG. 5 is a perspective view illustrating a portion of a reducer of an electronic power steering apparatus according to the second embodiment of the present invention.
Figure 6:
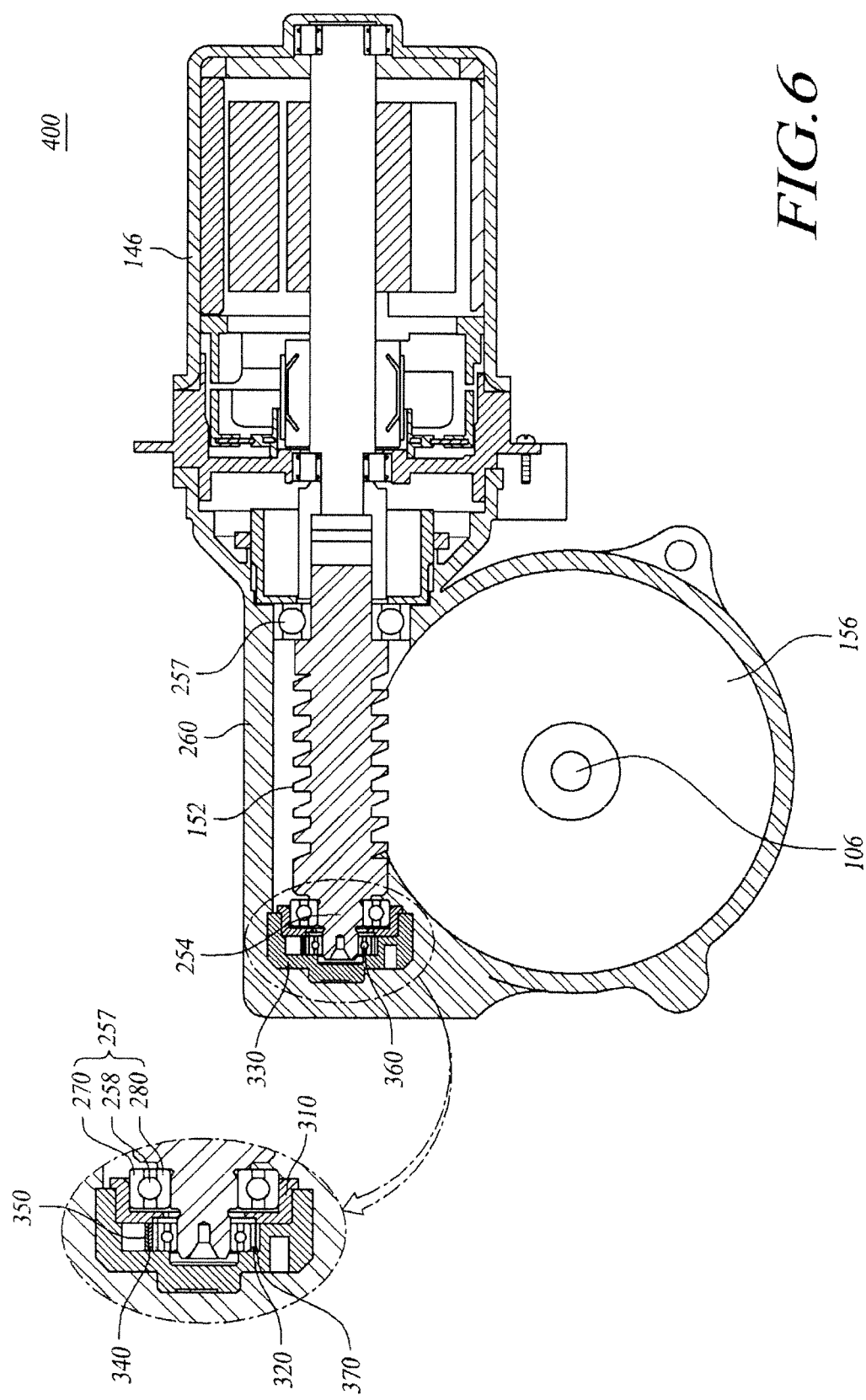
FIG. 6 is a sectional view of the reducer of FIG. 5.

FIG. 3 is a perspective view illustrating a portion of a reducer of an electronic power steering apparatus according to the first embodiment of the present invention. FIG. 4 is a sectional view of the reducer of FIG. 3. FIG. 5 is a perspective view illustrating a portion of a reducer of an electronic power steering apparatus according to the second embodiment of the present invention. FIG. 6 is a sectional view of the reducer of FIG. 5.

As illustrated in FIGS. 3 and 4, the reducer 300 of an electronic power steering apparatus 300 according to the first embodiment of the present invention includes a worm shaft bearing 257 supporting an end of a worm shaft 254 on which a worm 152 enmeshing with a worm wheel 156 is formed, the end of the worm shaft 254 being opposite to a portion of the worm shaft 254 to which a motor shaft is coupled; a hollow bearing holder 310 mounted on an outer race 270 of the worm shaft bearing 257 such that a clearance is maintained between the bearing holder 310 and the outer race 270 of the worm shaft bearing 257; a holder housing 330 surrounding the outer periphery of the bearing holder 310 and fitted with an inner end of a gear housing 260; a worm shaft holder 320 coupled to an end of the worm shaft 254 such that a clearance 370 is formed between the worm shaft holder 320 and the inner surface of the holder housing 330 in the direction of the worm wheel 156; and a resilient support 340 coupled between the inner surface of the holder housing 330 and the worm shaft holder 320 on a side of the holder housing 330 opposite to the worm wheel 156 to support the worm shaft holder 320 in the direction of the worm wheel 156.

In the reducer 400 of an electronic power steering apparatus according to the second embodiment of the present invention, as illustrated in FIGS. 5 and 6, a bush (not shown) (refer to 380 of FIG. 7) coated with polytetrafluoroethylene (PTFE, e.g., Teflon®) or a holder bearing 360 is inserted between the worm shaft holder 320 and an end of the worm shaft 254 to reduce the rotational friction of the worm shaft 254. Since the second embodiment of the present invention is the same as the first embodiment of the present invention except for the bush or the holder bearing 360, it will be described with reference to the first embodiment of the present invention hereinafter.

In the reducer 300 and 400 of the present invention, since the resilient support 340 or a support member 350 supports the worm shaft 254 within the gear housing 260 in the direction of the worm wheel 156, there occurs neither backlash nor noise during the rotation of the worm 152 and the worm wheel 156, preventing rattle noise.

The reducer aids the steering force of the driver by rotating the steering shaft 106 with the driver force of the motor 146 when the worm 152 and the worm wheel 156 move in association with each other. Worm shaft bearings 257 are coupled to opposite ends of the worm shaft 254 associated with the shaft of the motor 146 to support the rotation of the worm shaft 254 during drive of the motor 146, and the worm wheel 156 and the worm 152 associated with the steering shaft 106 is carried in the gear housing 260.

Meanwhile, the worm shaft bearing 257 in which balls 258 are interposed between the inner race 280 and the outer race 270 thereof supports the rotation of the worm shaft 254 at an end of the gear housing 260 opposite to the motor 146. A bearing holder 310 is mounted on the outer race 270 of the worm shaft bearing 257 and the holder housing 330 is mounted on the bearing holder 310 and fitted with the gear housing 260. The resilient support 340 supports an end of the worm shaft 254 in the direction of the worm wheel 156 by the medium of the worm shaft holder 320 within the holder housing 330, thereby preventing backlash or noise from being generated by the frictional wear between the worm 152 and the worm wheel 156.

The worm shaft bearings 257 are mounted on opposite ends of the worm shaft 254 to support the rotation of the worm shaft 254, and the balls 258 rotate between the inner races 280 and outer races 270 of the bearings 257 to reduce the rotational resistance of the worm shaft 254.

As such a worm shaft 254 continues to rotate, noise and backlash may be generated due to a clearance caused by the frictional wear between the worm 152 and the worm wheel 156. In the present invention, the resilient support 340 is mounted to a side of the worm shaft 254 opposite to the motor shaft to eliminate the clearance by pressing the worm shaft 254 toward the worm wheel 156.

The bearing holder 310 is hollowed and mounted on the outer race 270 of the worm shaft bearing 257 with a clearance being maintained between them. An end of the worm shaft 254 passes through a central portion of the bearing holder 310 to be coupled to the worm shaft bearing 257 and the bearing holder 310 is press-fitted with the outer race 270 of the worm shaft bearing 257 to prevent separation of the worm shaft bearing 257 and maintain a clearance between the bearing holder 310 and the worm shaft bearing 257.

The bearing holder 310 may be formed of engineering plastic such as acetal (POM) or a resilient material such as rubber or urethane to prevent impact noise generated by the worm shaft 254 during forward and backward drive of the motor 146.

The holder housing 330 surrounds the outer periphery of the bearing holder 310 and is coupled to an inner end of the gear housing 260 to support the worm shaft 254.

That is, the holder housing 330 surrounds the outer periphery of the bearing holder 310, is coupled to an inner end of the gear housing 260, and has holder recesses 333 into which the worm shaft holder 320 is inserted and support recesses 335 to which the resilient support 340 is coupled such that the resilient support 340 is supported by the holder housing 330 to support the worm shaft holder 320 coupled to the worm shaft 254 toward the worm wheel 156.

Here, the resilient support 340 has a support portion 345 attached to the outer surface of the worm shaft holder 320 and formed at a central portion thereof, and opposite end portions 343 formed by bending opposite sides thereof from the support portion 345 so as to form a plate spring coupled to the support recesses 335 of the holder housing 330.

The holder recesses 333 forms a clearance 370 with the worm shaft holder 320 toward the worm wheel 156 such that the worm shaft holder 320 coupled to the worm shaft 254 is supported toward the worm wheel 156.

Meanwhile, a support member 350 coupled to the support recesses 335 to support the resilient support 340 toward the worm shaft holder 320 may be coupled to the holder housing 330, and a central portion of the support member 350 may be attached to the support portion 345 of the resilient support 340 and may be bent to form a plate spring such that opposite ends of the support member 350 are coupled to the support recesses 335 of the holder housing 330.

However, the present invention is not limited thereto, and the resilient support 340 and the support member 350 may be resilient members having any suitable shapes including coil springs only if they can be coupled to the inner side of the holder housing 330 to support the worm shaft holder 320 toward the worm wheel 156.

The support member 350 has a spring coefficient greater than that of the resilient support 340 so that the resilient support 340 compensates for the clearance caused by minute vibration or wear due to the rotation of the worm shaft 254 and the support member 350 absorbs severe vibration or reverse input generated when a vehicle travels on an off road.

The worm shaft holder 320 is coupled to the worm shaft 254 outside the bearing holder 310 and has a block shape in which a shaft hole 325 through which an end of the worm shaft 254 passes is formed. The worm shaft holder 320 forms a clearance 370 in the direction of the worm wheel 156 with the holder recesses 333 of the holder housing 330 and is coupled to the worm shaft 254.

The holder bearing 360 may be inserted between the worm shaft holder 320 and an end of the worm shaft 254, and the worm shaft holder 320 may be coated with PTFE (e.g., Teflon®) to reduce the rotational friction resistance with an end of the worm shaft 254.

A bush 380 may be additionally press-fitted between an end of the worm shaft 254 and the worm shaft holder 320, and may be coated with PTFE (e.g., Teflon®) to reduce the rotational friction resistance with an end of the worm shaft 254.

Accordingly, if the resilient support 340 supports the worm shaft holder 320 to which the worm shaft 254 is coupled toward the worm wheel 156, the worm shaft holder 320 is supported within a range of the clearance 370 with the holder housing 330 to compensate for the clearance and eliminate noise and backlash.

Meanwhile, the worm shaft 254 compensates for the clearance with the worm wheel 156 by means of the resilient support 340 within the holder housing 330, and the resilient support 340 is coupled to the support recesses 335 formed on a side of the holder housing 330 opposite to the worm wheel 156 to support the end of the worm wheel 254 and compensate for the clearance with the worm wheel 156.

Figure 7:
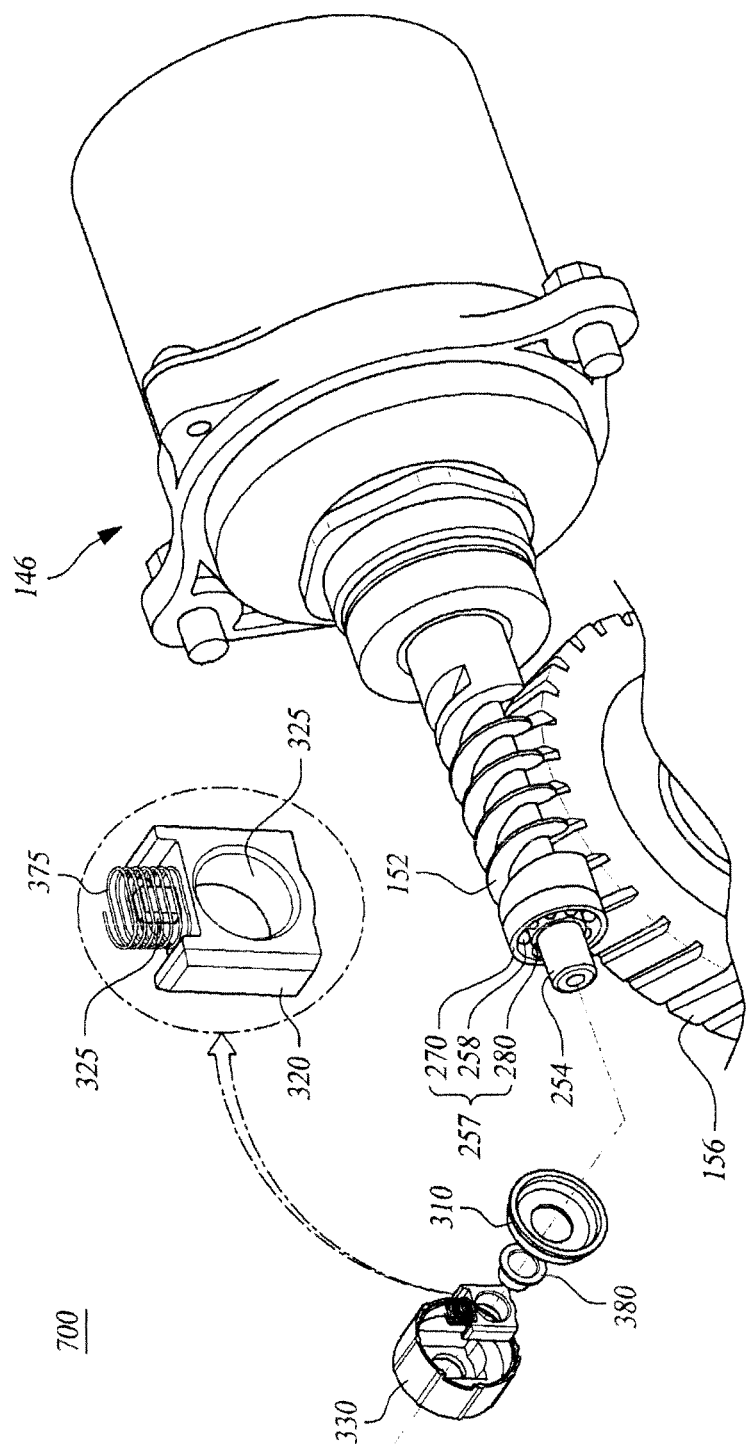
FIG. 7 is an exploded perspective view illustrating a portion of a reducer of an electronic power steering apparatus according to the third embodiment of the present invention.
Figure 8:
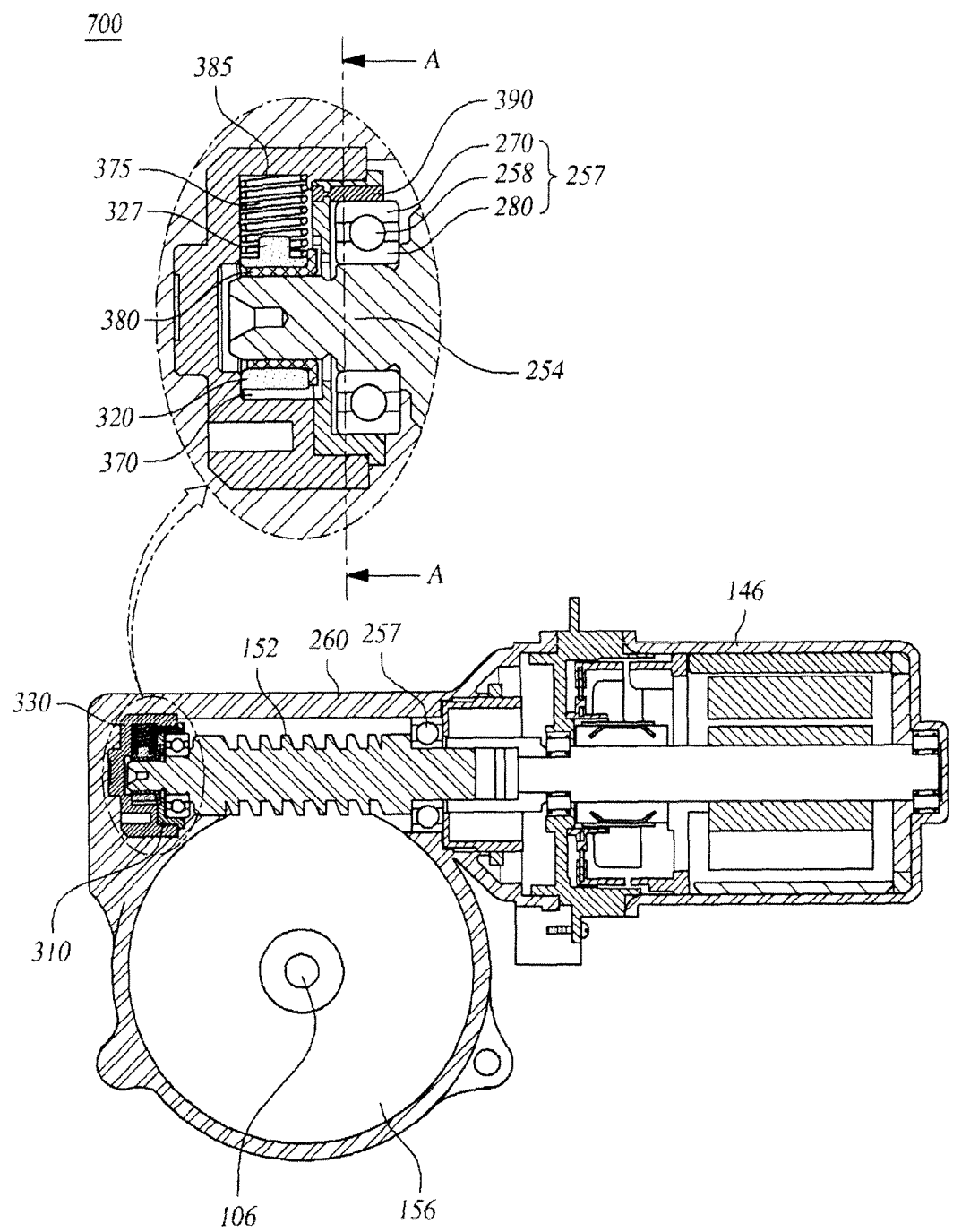
FIG. 8 is a sectional view of the reducer of FIG. 7.
Figure 9:
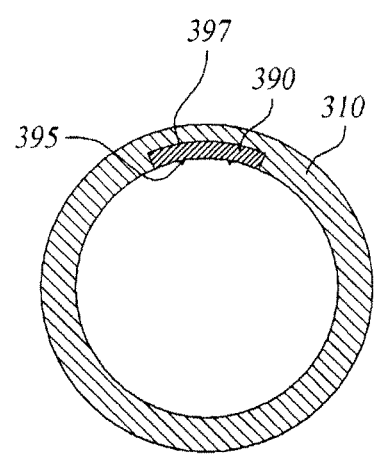
FIG. 9 is a sectional view of a bearing holder taken along line A-A of FIG. 8.

FIG. 7 is an exploded perspective view illustrating a portion of a reducer of an electronic power steering apparatus according to the third embodiment of the present invention. FIG. 8 is a sectional view of the reducer of FIG. 7. FIG. 9 is a sectional view of a bearing holder taken along line A-A of FIG. 8.

As illustrated in FIGS. 7 to 9, the electronic power steering apparatus 700 according to the third embodiment of the present invention is the same as the first and second embodiments of the present invention except for a bush 380 provided between the worm shaft holder 320 and the worm shaft 254 and coated with PTFE (e.g., Teflon®) to reduce the rotational friction with the worm shaft 254, a worm shaft holder 320 having a protrusion 327, a bearing support 390, and a nonlinear coil spring 375, and a detailed description of the common structures will be omitted and the characteristics of the third embodiment of the present invention will be mainly described.

The bearing holder 310 is formed of engineering plastic such as acetal (POM) or a resilient material such as rubber or urethane, and an end of the worm shaft 254 passes through the center of the bearing holder 310 and coupled to the worm shaft bearing 257. The bearing holder 310 surrounds the outer race 270 of the worm shaft bearing 257 and is press-fitted with the worm shaft bearing 257 with a clearance being maintained therebetween to prevent separation of the worm shaft bearing 257.

A cut-away recess 397 may be formed at an inner peripheral end of the bearing holder 310 opposite to the worm wheel so as to be coupled to the bearing support 390 to prevent impact noise and rattle noise generated in the worm shaft 254 during forward and backward drive of the motor 146 due to the bearing support 390.

Here, the bearing support 390 is formed of a resilient material such as rubber or urethane to prevent noise with the worm shaft bearing 257, and is separately manufactured to be inserted and coupled into the cutaway recess 397 or is integrally injection-molded with the cutaway recess 397 of the bearing holder 310.

More than one protrusions 395 may be formed in the bearing support 390 on its contact surface with the worm shaft bearing 257 and be assembled with the outer race 270 of the worm shaft bearing 257 to support the worm shaft bearing 257 due to its resilient deformation.

The bearing holder 310 has an insert recess 385 to which the resilient support 375 is coupled on the inner surface thereof opposite to the worm wheel 156 to prevent separation of the resilient support 375 during assembly.

The worm shaft holder 320 has a block shape having a shaft hole 325 to be coupled to an end of the worm shaft 254 outside the bearing holder 310 and is coupled to an end of the worm shaft 254, forming a clearance 370 with the inner peripheral surface of the holder housing 330 in the direction of the worm wheel 156.

The holder housing 330 has an insert recess 385 by which the resilient support 375 is supported on the inner surface of the worm wheel 156.

Here, the worm shaft holder 320 has a protrusion 327 into which the resilient support 375 is inserted on the outer surface thereof opposite to the worm wheel 156, and may be coated with PTFE (e.g., Teflon®) to reduce the rotational friction resistance with an end of the worm shaft 254.

Therefore, when the resilient support 375 supports the worm shaft holder 320 toward the worm wheel 156, the worm shaft holder 320 is supported toward the worm wheel in a range of the clearance 370 with the holder housing 330. Here, the resilient support 375 is a nonlinear coil spring whose central shape is slotted or elliptical instead of a general circular coil spring.

Figure 10:
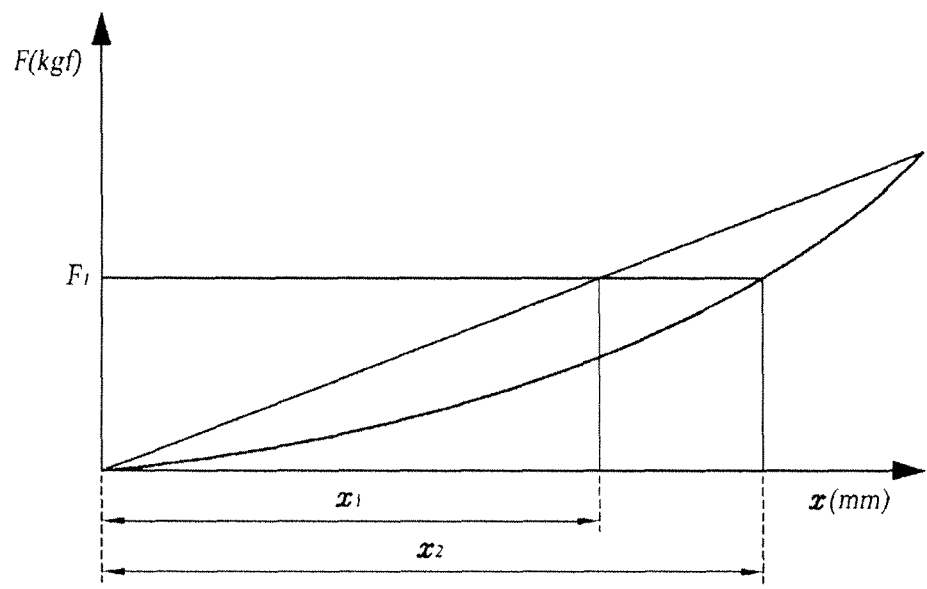
FIG. 10 is a force-displacement graph of a nonlinear coil spring of a reducer of an electronic power steering apparatus according to the present invention.

FIG. 10 is a force-displacement graph of a nonlinear coil spring of a reducer of an electronic power steering apparatus according to the present invention.

As illustrated in FIG. 10, in a general circular coil spring, its displacement is linear to a load and is small when a load is applied to it. On the other hand, in a nonlinear coil spring, its displacement is nonlinear to a load and is relatively large when the same load is applied to it.

That is, a same load $F_1$ is applied, the displacement of a general circular coil spring is $x_1$ but the displacement of a nonlinear coil spring is $x_2$ which is larger than $x_1$, absorbing a wider range of loads.

Therefore, with the same displacement, the nonlinear coil spring absorbs a load higher than the load of the general circular coil spring. Thus, the support force of the nonlinear coil spring becomes larger in a narrow space between the holder housing and an end of the worm shaft.

The reducer of an electronic power steering apparatus according to the present invention aids the operation of a steering wheel by the driver by preventing a clearance from being caused by frictional wear between a worm and a worm wheel, by reducing rattle noise caused by backlash, and by minimizing the change in the clearance due to a change in torque.

Even when all the elements of the embodiments of the invention are combined into one, the invention is not limited thereto. That is, all the elements may be selectively combined with each other without departing the scope the invention.

Also, the phraseology and terminology used herein is for the purpose of description and should not be regarded as limiting. The use of "including", "comprising", or "having", and variations thereof herein, is meant to encompass the items listed thereafter and equivalents thereof as well as additional items. Unless otherwise specifically defined herein, all terms including technical or scientific terms are to be given meanings understood by those skilled in the art. Like terms defined in dictionaries, generally used terms needs to be construed as meanings used in technical contexts and are not construed as ideal or excessively formal meanings unless otherwise clearly defined herein.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. Therefore, the embodiments of the invention are given not to limit but to explain the technical spirit of the invention, and the scope of the invention is not limited by the embodiments. The scope of the invention should be construed by the claims, and the equivalents to the invention are construed as included in the scope of the invention.

What is claimed is:

1. A reducer of an electronic power steering apparatus, comprising:
    a worm shaft bearing supporting an end of a worm shaft on which a worm enmeshing with a worm wheel is disposed, the end of the worm shaft being opposite to a portion of the worm shaft to which a motor shaft is coupled;
    a hollow bearing holder disposed on an outer race of the worm shaft bearing such that a clearance is maintained between a portion of the bearing holder and a portion of the outer race of the worm shaft bearing;
    a holder housing surrounding an outer periphery of the bearing holder, the holder housing being arranged within a gear housing in an axial direction of the worm shaft such that an outer surface of the holder housing faces an inner surface of the gear housing;
    a worm shaft holder coupled to the end of the worm shaft such that a clearance is defined between the worm shaft holder and an inner surface of the holder housing in a direction toward the worm wheel; and
    a resilient support coupled between the inner surface of the holder housing and the worm shaft holder on a side of the holder housing opposite to the worm wheel to support the worm shaft holder in the direction toward the worm wheel.

2. The electronic power steering apparatus as claimed in claim 1, wherein the holder housing has a holder recess in which the worm shaft holder is disposed and has a support recess to which the resilient support is coupled.

3. The electronic power steering apparatus as claimed in claim 2, wherein the resilient support has:
    a support portion attached to an outer surface of the worm shaft holder at a central portion of the resilient support, and
    opposite end portions having bent portions at opposite sides of the resilient support and having a shape of a plate spring to be coupled to the support recess of the holder housing.

4. The electronic power steering apparatus as claimed in claim 2, wherein the holder recess has a clearance with the worm shaft holder in the direction toward the worm wheel.

5. The electronic power steering apparatus as claimed in claim 2, wherein a support member coupled to the support recess to support the resilient support toward the worm shaft holder is coupled to the holder housing.

6. The electronic power steering apparatus as claimed in claim 5, wherein the support member has bent portions at opposite ends thereof to have a shape of a plate spring such that the opposite ends of the support member are coupled to the support recess of the holder housing.

7. The electronic power steering apparatus as claimed in claim 1, wherein the worm shaft holder is coated with polytetrafluoroethylene (PTFE).

8. The electronic power steering apparatus as claimed in claim 1, wherein a bush coated with polytetrafluoroethylene (PTFE) is disposed and coupled between the worm shaft holder and an end of the worm shaft.

9. The electronic power steering apparatus as claimed in claim 1, wherein a holder bearing is disposed and coupled between the worm shaft holder and the end of the worm shaft.

10. The electronic power steering apparatus as claimed in claim 1, wherein:
    the worm shaft holder includes a protrusion, with which the resilient support is fitted, on an outer surface of the worm shaft holder opposite to the worm wheel, and
    the resilient support is a nonlinear coil spring having a slotted or elliptical central shape and fitted with the protrusion.

11. The electronic power steering apparatus as claimed in claim 10, wherein the holder housing has an insert recess by which the resilient support is supported on an inner surface thereof opposite to the worm wheel.

12. The electronic power steering apparatus as claimed in claim 1, wherein:
- the bearing holder has a cutaway recess defined at an inner peripheral end thereof opposite to the worm wheel, and
- a bearing support supporting the worm shaft bearing is disposed in or integrally disposed with the cutaway recess of the bearing holder.

13. The electronic power steering apparatus as claimed in claim 12, wherein:
- the bearing support includes plastic or a resilient material, and
- more than one protrusions are disposed on a contact surface of the bearing support with the worm shaft bearing.

* * * * *